United States Patent [19]

Takahashi et al.

[11] Patent Number: 4,817,133
[45] Date of Patent: Mar. 28, 1989

[54] PARTY SELECTING CIRCUIT ARRANGEMENT

[75] Inventors: Ryoichi Takahashi, Gunma; Seiichi Ogawa, Ohta; Isao Ohtawara, Gunma, all of Japan

[73] Assignee: Sanyo Electric Co., Ltd., Japan

[21] Appl. No.: 96,720

[22] Filed: Sep. 14, 1987

[30] Foreign Application Priority Data

Sep. 16, 1986 [JP] Japan ................................ 61-218542
Sep. 19, 1986 [JP] Japan ................................ 61-222632
Sep. 19, 1986 [JP] Japan ................................ 61-144466
Mar. 19, 1987 [JP] Japan ................................ 62-64770

[51] Int. Cl.$^4$ ........................................... H04M 1/27
[52] U.S. Cl. ..................................... 379/199; 379/355; 379/142
[58] Field of Search ............... 379/387, 354, 355, 188, 379/189, 199, 142, 375

[56] References Cited

U.S. PATENT DOCUMENTS 4,266,098  5/1981  Novak ............................. 379/142 X
4,296,282 10/1981  O'Neil et al. .................... 379/142 X
4,639,552  1/1987  Hall ................................. 379/199
4,658,419  4/1987  Denen ............................. 379/375

Primary Examiner—James L. Dwyer
Attorney, Agent, or Firm—Darby & Darby

[57] ABSTRACT

According to the party selecting circuit arrangement of a telephone of the present invention, an owner of the telephone can avoid a mischievous call or an erroneous call since it is so arranged that a call sound is discharged through the speaker only when the number given by the party other than the owner of the telephone is coincident with the telephone number stored as a secret number in the memory circuit of the telephone. Moreover, the party selecting circuit arrangement according to the present invention enables the owner of the telephone to identify the other party before he or she answers the call since an indicating element which indicates the number of the auto-dialing operation button provided correspondingly to the memory circuit storing the secret telephone number is turned on only at the above-described time.

4 Claims, 4 Drawing Sheets

PARTY SELECTING CIRCUIT ARRANGEMENT

BACKGROUND OF THE INVENTION

1. Field of the Invention

The present invention generally relates to a telephone and more particularly, to a party selecting circuit arrangement or specifically a party indicating arrangement built in a telephone which is arranged to protect an owner of the telephone from a mischievous call or an erroneous call.

2. Description of the Prior Art

A telephone is constructed in such a manner that, when a party other than the owner of the telephone makes a call, a call sound generated in correspondence to a call signal from a telephone line is heard to notify the owner that the incoming call is received. In the above-described construction of the telephone, however, it cannot be avoided that the owner of the telephone is always called up even by a mischievous call which is made out of mischief and also an erroneous call which is made in error. It may be extremely unpleasant to the owner of the telephone. Therefore, in order to solve the above-described inconvenience, such an improved telephone has been developed that is arranged to discharge a call sound only when a person acquainted with the secret number of the telephone calls up, as disclosed in the published specification of Japanese Patent Laid-Open Publication Tokkaisho (Unexamined) No. 55-11668 (11668/1980).

In the meantime, it is disadvantageously poor operative and easy to dial a wrong number when the entire number of the telephone should be dialed, another type of a telephone which is equipped with an automatic dialing system that allows one-touch dialing with the use of a memory circuit has become widely popular. This type of the telephone is disclosed in the published specification of Japanese Patent Publication Tokkosho No. 53-30601 (30601/1978).

However, in the above-described telephone which is arranged to distinguish or select a caller party by the utilization of the secret number, the secret number is determined by the owner of the telephone, and therefore it is necessitated that the owner should inform the secret number to particular parties, and at the same time it is insecure that the particular parties may forget the secret number.

SUMMARY OF THE INVENTION

Accordingly, the present invention has its essential object to provide a party selecting circuit arrangement, particularly, a party indicating arrangement of a telephone, with substantial elimination of the above-described disadvantages or inconveniences inherent in the prior art.

In accomplishing the above-described object, a party selecting circuit arrangement according to the first embodiment of the present invention is so arranged that when a number corresponding to a DTMF signal sent out from the party other than the owner of the telephone after the call is received is coincident with the telephone number stored in a memory circuit of the telephone, a call signal is generated, and at the same time, an indicating element corresponding to an operating button for automatic dialing which is provided in correspondence to the memory circuit storing the telephone number is turned on. Accordingly, in the party selecting circuit arrangement having the aforementioned construction, the telephone number stored in the memory circuit provided for automatic dialing can be utilized as a secret number for distinguishing the party. Moreover, the turning-on of the indicating element can notify the owner of the telephone who the other party is.

A further object of the present invention is to provide a party selecting circuit arrangement of a telephone of the type referred to above which is so arranged that when a number corresponding to a DTMF signal sent out by the other party after the call is received is coincident with a telephone number stored in a memory circuit of the telephone, a call signal is generated, and at the same time, a number of an operating button for automatic dialing provided in correspondence to the memory circuit storing the telephone number is indicated by a numerical indicator. Accordingly, in the party selecting circuit arrangement according to the second embodiment of the present invention, the telephone number stored in the memory circuit provided for automatic dialing can be utilized as a secret number for distinguishing a party, and at the same time, who the party is can be easily noticed by the number indicated by the numerical indicator.

A still further object of the present invention is to provide a party selecting circuit arrangement of a telephone of the type referred to above which is so arranged that when a number corresponding to a DTMF signal sent out by the party other than the owner of the telephone after the call is received is coincident with the telephone number stored in a memory circuit, a call signal is generated, and at the same time, a number of an operating button for automatic dialing provided in correspondence to the memory circuit storing the telephone number or the telephone number is indicated by a numerical indicator which is switched to be inoperable when the handset is off the hook. Accordingly, in the party selecting circuit arrangement according to the third embodiment of the present invention, the telephone number stored in the memory circuit provided for automatic dialing can be utilized as a secret number for distinguishing the party. Moreover, the number indicated by the numerical indicator can notify the owner of the telephone who the party is. At the same time, when the conversation begins with the handset off the hook, the numerical indicator is turned into the inoperable condition.

A yet further object of the present invention is to provide a party indicating device of a telephone which is comprised of a first signal generating circuit which detects a ringer signal sent from the other party and generates a first call signal, a hook controlling circuit which is controlled by the first call signal to close the telephone line, a number comparing circuit which compares a number corresponding to a DTMF signal sent out by the other party after the telephone line has been closed with the secret number, and generates a signal regularly repeating the first level and the second level alternately with each other when the numbers are coincident, a second signal generating circuit which is turned operable in correspondence to the first level signal outputted by the number comparing circuit to generate a second call signal, and an indicating circuit which is turned operable in correspondence to the second level signal outputted by the number comparing circuit to perform indication. Accordingly, in the party indicating device of the telephone according to the fourth embodiment of the present invention, the second call signal generating circuit is arranged to receive an operating power from the telephone line when it receives the first level signal generated by the number comparing circuit, while the indicating circuit is arranged to receive the operating power from the telephone line when it receives the second level signal from the number comparing circuit.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
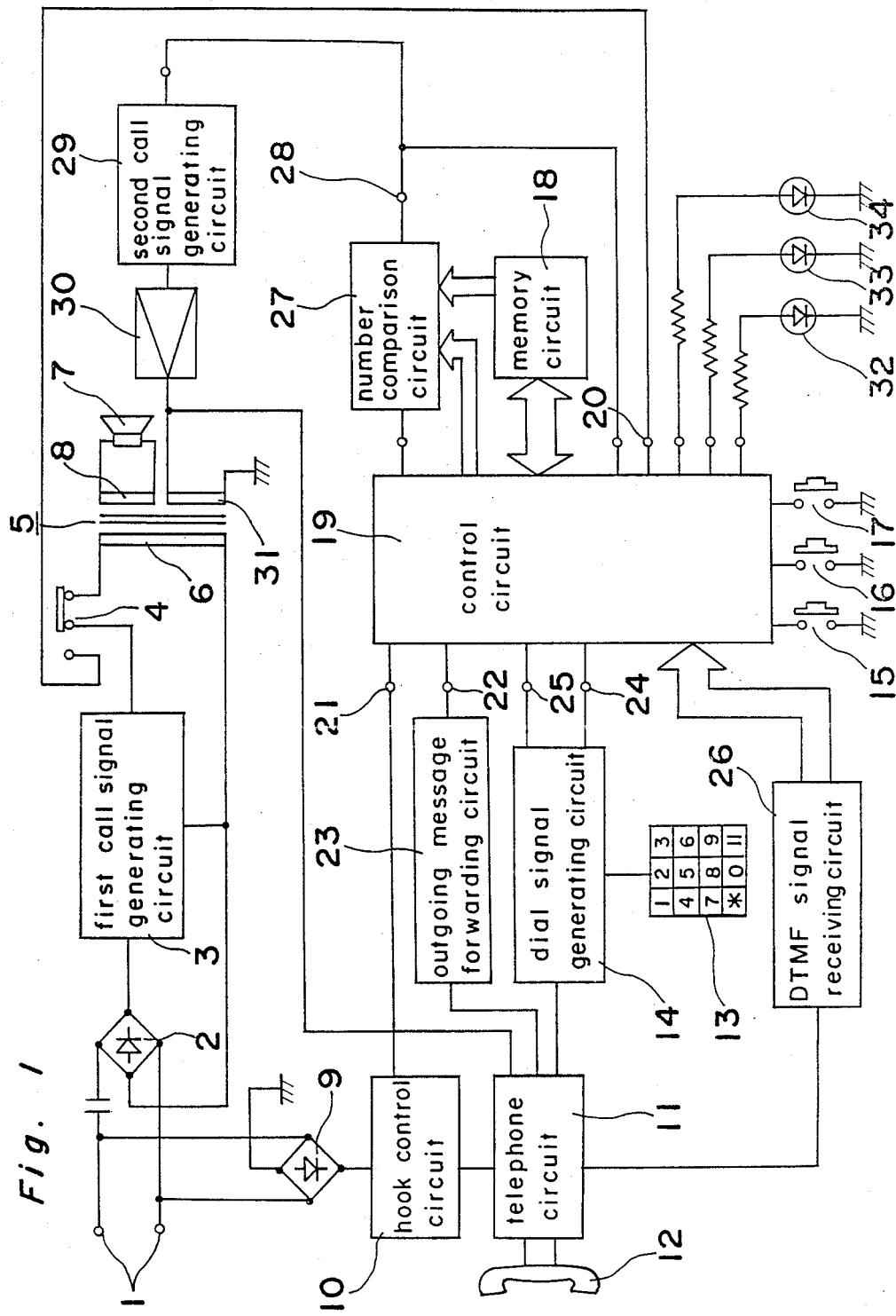
FIG. 1 is a circuit diagram showing the circuit structure of a party selecting circuit arrangement of a telephone according to a first embodiment of the present invention.

Before the description of the present invention proceeds, it is to be noted that like parts are designated by like reference numerals throughout the accompanying drawings.

Referring to FIG. 1, there is shown a circuit diagram of a party selecting circuit arrangement of a telephone according to a first embodiment of the present invention. The party selecting circuit arrangement shown in FIG. 1 includes a connecting terminal 1 connected to a telephone line, a first diode bridge circuit 2 for rectifying a call signal coming from the telephone line, a first call signal generating circuit 3 which outputs a call signal in correspondence to a call signal applied thereto after the call signal is rectified by the first diode bridge circuit 2, and a selecting switch 4 which is provided so as to select whether or not the party selecting operation can be carried out. It is to be noted here that the circuit of FIG. 1 is in the inoperable condition for the party selecting operation. When the selection switch 4 is in the inoperable position, a call signal from the first call signal generating circuit 3 is added to a first coil 6 through a transformer 5. A speaker 7 for discharging the call signal in sound is connected as a load to a second coil 8 of the transformer 5. There are further included in the party selecting circuit arrangement a second diode bridge circuit 9 for determining the connection polarity with the telephone line, a hook control circuit 10 which controls the telephone line to be closed, and a telephone circuit 11 called a speech network and connected with a handset 12. A dial signal generating circuit 14 outputs a dial signal corresponding to a number gained through manipulation of a dialing operation button 13. First, second and third operation switches 15, 16 and 17 are closed through manipulation of respective automatic dialing operation buttons. A memory circuit 18 is provided in order to store some telephone numbers for automatic dialing, and a control circuit 19 controls these telephone numbers to be stored into or called up from the memory circuit 18 in correspondence to the manipulation of each of the above-described operation switches 15–17. When the selection switch 4 is in the operable position, a signal generated from the first signal generating circuit 3 is applied to a control terminal 20, when the control circuit 19 starts the storing or the calling-up operation. An output terminal 21 for outputting a control signal to control the operation of the hook control circuit 10 is provided in the control circuit 19. At the same time, the output terminal 21 is so adapted that when a signal is added to the control terminal 20, the terminal 21 generates a signal for closing the telephone line. After the telephone line has been closed through the operation of the hook control circuit 10 by the signal generated from the output terminal 21, a driving signal is produced by a driving signal output terminal 22. When the driving signal is outputted to the terminal 22, an outgoing message forwarding circuit 23 is turned operable so as to send out a message urging the other party to give the secret number. Into an input terminal 24 provided in the control circuit 19 is inputted a signal corresponding to the number of the dialing operation button 13 when the telephone number is being stored in the memory circuit 18. On the other hand, to an output terminal 25 provided in the control circuit 19 is outputted the telephone number called up by the memory circuit 18 during the automatic dialing operation. The output terminal 25 is connected to the dialing signal generating circuit 14. A DTMF signal sent out by the other party as the secret number is received by a DTMF signal receiving circuit 26 which is arranged to output the coded signal to the control circuit 19, and at the same time, allows the coded signal to be stored in a received number memory circuit (not shown) built in the control circuit 19. A number comparing circuit 27 is brought into the operable condition when the telephone line is closed by the hook control circuit 10, such that the telephone number stored in the memory circuit 18 is compared with the number stored in the received number memory circuit (not shown). If both of the above-described numbers agree with each other, an H level signal is generated from an output terminal 28 provided with the number comparing circuit 27. In the party selecting circuit arrangement having the construction as described above, the memory circuit 18 stores the subscriber's number, the telephone office number in the city and the telephone office number from outside the city. The comparison of the numbers is conducted in the comparison circuit 27, for example, by the subscriber's number, namely, the four numbers from the end. When an H level signal is generated to the output terminal 28 of the comparison circuit 27, a second signal generating circuit 29 is turned into the operable condition, thereby to output a call signal different from the call signal generated by the first call signal generating circuit 3. The call signal generated by the second call signal generating circuit 29 is amplified by an amplification circuit 30 which is so connected that an output thereof is applied to a third coil 31 constituting the transformer 5 and also to the telephone circuit 11. First, second and third light emitting diodes 32, 33 and 34 placed in correspondence to the respective auto-dialing operation buttons are turned on when the respective first, second and third operation switches 15, 16 and 17 are closed. At the same time, it is so arranged that one of the light emitting diodes which corresponds to the telephone number is turned on when the telephone number is found coincident with the number corresponding to the DTMF signal sent out by the other party as a result of the comparison by the comparison circuit 27. In the circuit arrangement described above, in the case where the number sent out by the other party is not coincident with the telephone number stored in the memory circuit 18, the hook control circuit 10 is returned back a predetermined time later, and therefore the telephone line is released to be opened. Moreover, if the handset 12 is off the hook while the call signal from the second call signal generating circuit 29 is being discharged through the speaker 7, the second call signal generating circuit 29 is brought into the inoperable condition.

Explanation will be given hereinbelow of the operation of the party selecting circuit arrangement having the above-described construction.

First of all, how the telephone number is stored in the memory circuit 18 will be described. In order to store the telephone number in the memory circuit 18, in the state where a memory switch (not shown) which is switched only during the storing operation, each of the first, second and third operating switches 15, 16 and 17 should be manipulated and at the same time, the dialing operation button 13 should be pushed to represent the telephone number desired to be stored. Meanwhile, the outgoing message forwarding circuit 23 is built in with the message memory circuit storing the outgoing message, and therefore, when the outgoing message is stored, the voice of the owner of the telephone is stored. Thus, such an outgoing message, for example, "This is . . . speaking. Please give me your telephone number." is stored.

In the manner as described hereinabove, the storage of the telephone number in the memory circuit 18 and the storage of the outgoing message in the outgoing message forwarding circuit 23 are carried out.

The operation of the party selecting circuit arrangement as a telephone will now be described.

In the case where a call is made by the owner of the telephone to a party having the telephone number not stored in the memory circuit 18, the handset 12 should be taken off the hook and then the dialing operation button 13 should be manipulated. When the handset 12 is off the hook, a hook switch (not shown) is switched, as is well known, thereby to close the telephone line. In the above state, upon manipulation of the dialing operation button 13, the dial signal corresponding to the number represented by the dialing operation button 13 is outputted from the dialing signal generating circuit 14 to be sent out to the telephone line through the telephone circuit 11.

Although the operation of the party selecting circuit arrangement when a call is made by the owner of the telephone is carried out in the above-described manner with the use of the dialing operation button 13, the automatic dialing operation will be conducted in the following manner. Namely, while the handset 12 is off the hook, the operating switches 15, 16 and 17 provided correspondingly to respective memories each storing the telephone number of a desired party are closed through manipulation of the automatic dialing operation button. By way of example, when the first operating switch 15 is depressed and closed, the telephone number stored in the memory corresponding to the first operating switch 15 among the telephone numbers in the memory circuit 18 is called up, through the control circuit 19, to be added to the dialing signal generating circuit 14. As a result, the dialing signal corresponding to the telephone number is outputted from the dialing signal generating circuit 14 and sent out to the telephone line through the telephone circuit 11. At the same time, during the above operation, the first light emitting diode 32 provided in correspondence to the first operating switch 15 is turned on, thus indicating that the first operating switch 15 is manipulated.

The owner of the telephone can make a call by the automatic dialing operation in the above-described manner. On the contrary, when the owner receives a call from the other party, the party selecting circuit arrangement will be operated as follows.

The operation of the party selecting circuit arrangement in the case where the selecting switch 4 is in the inoperable position as shown in FIG. 1, that is, when the party selecting circuit works as a normal telephone will be described first.

In the state illustrated in FIG. 1, when a call signal is received through the telephone line, the call signal is applied to the first call signal generating circuit 3 through the first diode bridge circuit 2. Subsequently, the first call signal generating circuit 3 is turned operable, to an output terminal of which is outputted the electronized call signal. The call signal outputted from the first call signal generating circuit 3 is then applied to the first coil 6 constituting the transformer 5 through the selecting switch 4. Thereafter, the call signal is induced to the second coil 8 having the speaker 7 connected as a load, to be discharged as a call sound through the speaker 7. Accordingly, the owner of the telephone can recognize that a call is coming. At this time, if the handset 12 is placed off the hook, the telephone line is closed to effect conversation between the owner of the telephone and the other party.

The party selecting circuit arrangement as a normal telephone is operated in the manner as above. However, if the selecting switch 4 is in the operable position, namely, in the position to select the party, the operation of the party selecting circuit will be as follows.

In other words, when a call signal is received through the telephone line while the selecting switch 4 is in the operable position, the call signal is outputted from the first call signal generating circuit 3 as has been described earlier. In this state, the call signal is intercepted and not sent to the first coil 6 because of the switching of the selecting switch 4, and therefore the call sound is never discharged from the speaker 7. On the contrary, the call signal outputted from the first call signal generating circuit 3 is applied, through the selecting switch 4, to the control terminal 20 provided with the control circuit 19. Thus, the controlling operation by the control circuit 19 is started. As soon as the call signal is applied to the control terminal 20 of the control circuit 19, a signal for closing the telephone line is generated to the output terminal 21 and therefore the telephone line is closed by the hook control circuit 10. After the telephone line is closed as above, a driving signal is outputted to the driving signal outputting terminal 22 provided with the control circuit 19 to be applied to the outgoing message forwarding circuit 23. In consequence to this, the outgoing message forwarding circuit 23 is brought into the operable condition, thereby to output the message stored in the message memory circuit (not shown), i.e., "This is . . . speaking. Please give me your telephone number." urging the secret number to the other party through the telephone circuit 11.

When the other party hears the message and manipulates the dialing button to send out the telephone number, a signal corresponding to the dialing button, that is, a DTMF signal is sent out to the telephone line. The DTMF signal sent out by the other party is applied to the DTMF signal receiving circuit 26 through the second diode bridge circuit 9, the hook control circuit 10 and the telephone circuit 11. Upon application of the DTMF signal to the DTMF signal receiving circuit 26, the DTMF signal receiving circuit 26 outputs the signal coded in correspondence to the telephone number which is in turn inputted to the control circuit 19. The coded signal inputted into the control circuit 19 is stored by the received number memory circuit built in the control circuit 19. Thereafter, the number stored in the received number memory circuit is compared with the telephone number stored in the memory circuit 18 by the number comparing circuit 27. In the case where the number stored in the received number memory circuit agrees with the telephone number stored in the memory circuit 18, an H level signal is outputted to the output terminal 28 of the number comparison circuit 27 and then applied to the second call signal generating circuit 29. Accordingly, the second call signal generating circuit 29 is turned operable to output a call signal different from that from the first call signal generating circuit 3. After the call signal from the second call signal generating circuit 29 is inputted to be amplified in the amplification circuit 30, it is applied to a third coil 31 constituting the transformer 5. Therefore, the call signal is induced to the second coil 8 connected with the speaker 7 as a load, and discharged through the speaker 7 as a call sound. Since the call signal from the second call signal generating circuit 29 which is amplified by the amplification circuit 30 is forwarded to the other party through the telephone circuit 11 while the call sound is discharged from the speaker 7, the other party can recognize that the telephone is ringing. Moreover, when the number stored in the received number memory circuit is found to be coincident with the telephone number stored in the memory circuit 18 as a result of the comparison by the number comparison circuit 27, for instance, the first light emitting diode 32 provided in correspondence to the first operating switch 15 corresponding to the telephone number is driven to be lighted. Therefore, the owner of the telephone is able not only to recognize by the call sound discharged through the speaker 7 that the call is received, but to find out from the tone difference of the call sound that the received call is based on the party selecting operation. In addition, the owner of the telephone can further recognize by the lighting of the first light emitting diode 32 who the other party is. If the handset 12 is taken off the hook after the above-described recognition by the owner of the telephone, both the number comparing circuit 27 and the second call signal generating circuit 29 are turned into the inoperable condition. Simultaneously with this, the owner can start the conversation with the other party. Thus, as described above, when the number sent out from the other party and the telephone number stored in the memory circuit 18 are coincident with each other, the call signal is generated by the second call signal generating circuit 29 so as to call up the owner of the telephone, and at the same time, one of the light emitting diodes 32, 33 and 34 is turned on so as to indicate the caller, i.e., the other party. On the other hand, however, if the numbers are not coincident with each other, an H level signal is never outputted to the output terminal 28 of the number comparing circuit 27, without the calling-up operation and the indicating operation being performed. After a predetermined time has passed, a signal for releasing the telephone line from its closed state is outputted to the output terminal 21, and accordingly, the telephone line is released to be opened by the hook control circuit 10. In the case where the call is received from the party having the number not coincident with the telephone number stored in the memory circuit 18, as above, the call signal is not discharged out of the speaker 7, resulting in effective exclusion of a mischievous call or an erroneous call.

Although there are three telephone numbers stored for automatic dialing in the party selecting circuit arrangement of the present invention, the number of the stored telephone numbers is not limited to three. Moreover, although the outgoing message is stored in the memory circuit for forwarding the outgoing message in the above-described first embodiment of the present invention, a tape recorder may be utilized for the purpose.

As has been described hereinabove, since the party selecting circuit arrangement according to the first embodiment of the present invention is adapted to discharge the call signal only when the number corresponding to the DTMF signal sent out by the party other than the owner of the telephone after the call is received is coincident with the telephone number stored in the memory circuit of the telephone, the owner can be protected from mischievous calls or erroneous calls. Besides, in the party selecting circuit arrangement of the first embodiment of the present invention, the telephone number stored in the memory circuit provided for automatic dialing is utilized as a secret number so as to select the other party, it becomes unnecessary for the owner of the telephone to inform the secret number to particular parties, and moreover, such inconvenience which results if the other party forgets the secret number can be advantageously solved. Furthermore, according to the first embodiment, when the number corresponding to the DTMF signal from the other party agrees with the telephone number stored in the memory circuit of the telephone, the indicating element corresponding to the automatic dialing operation button which is provided in correspondence to the memory circuit storing the telephone number is lighted, thereby to inform the owner of the telephone who the other party is before the owner answers the call.

A party selecting circuit arrangement according to a second embodiment of the present invention will be described with reference to FIG. 2 in which reference numerals 1–31 are respectively corresponding to those reference numerals 1–31 of the first embodiment shown in FIG. 1, having the same structure, and accordingly like parts are designated by like reference numerals and the description thereof will be abbreviated here.

The party selecting circuit arrangement according to the second embodiment of the present invention is comprised of a received number memory circuit 47 which stores a number received by the DTMF signal receiving circuit 26, and a driving circuit 43 which is brought into the operable condition when the number corresponding to the DTMF signal sent out by the other party is found to be coincident with the telephone number stored in the memory circuit 18 through the comparing operation by the number comparing circuit 27, such that the number of the automatic dialing operation button which is provided in correspondence to the memory circuit storing the above coincident telephone number is indicated by a numerical indicator 44. In the aforementioned construction, if the number sent out by the other party does not coincide with the telephone number stored in the memory circuit 18, it is so arranged that the hook control circuit 10 releases the telephone line to be opened after the lapse of the predetermined time. Further, when the call signal outputted from the second call signal generating circuit 29 is being discharged by the speaker 7, namely, when the calling-up operation resulting from the coincidence of the numbers compared by the number comparing circuit 27 is being performed, and the handset 12 is off the hook, it is so arranged that both the second call signal generating circuit 29 and the driving circuit 43 are turned into the inoperable condition.

The party selecting circuit arrangement according to the second embodiment of the present invention having the above-described construction operates in the following manner.

Each of the storing operation of the telephone number into the memory circuit 18, the storing operation of the outgoing message into the memory circuit, and the operation as a normal telephone is, with reference to the cases where a call is made by the owner of the telephone and a call is made by the party other than the owner, carried out in the same manner as according to the first embodiment, and therefore the description thereof will be abbreviated.

Figure 2:
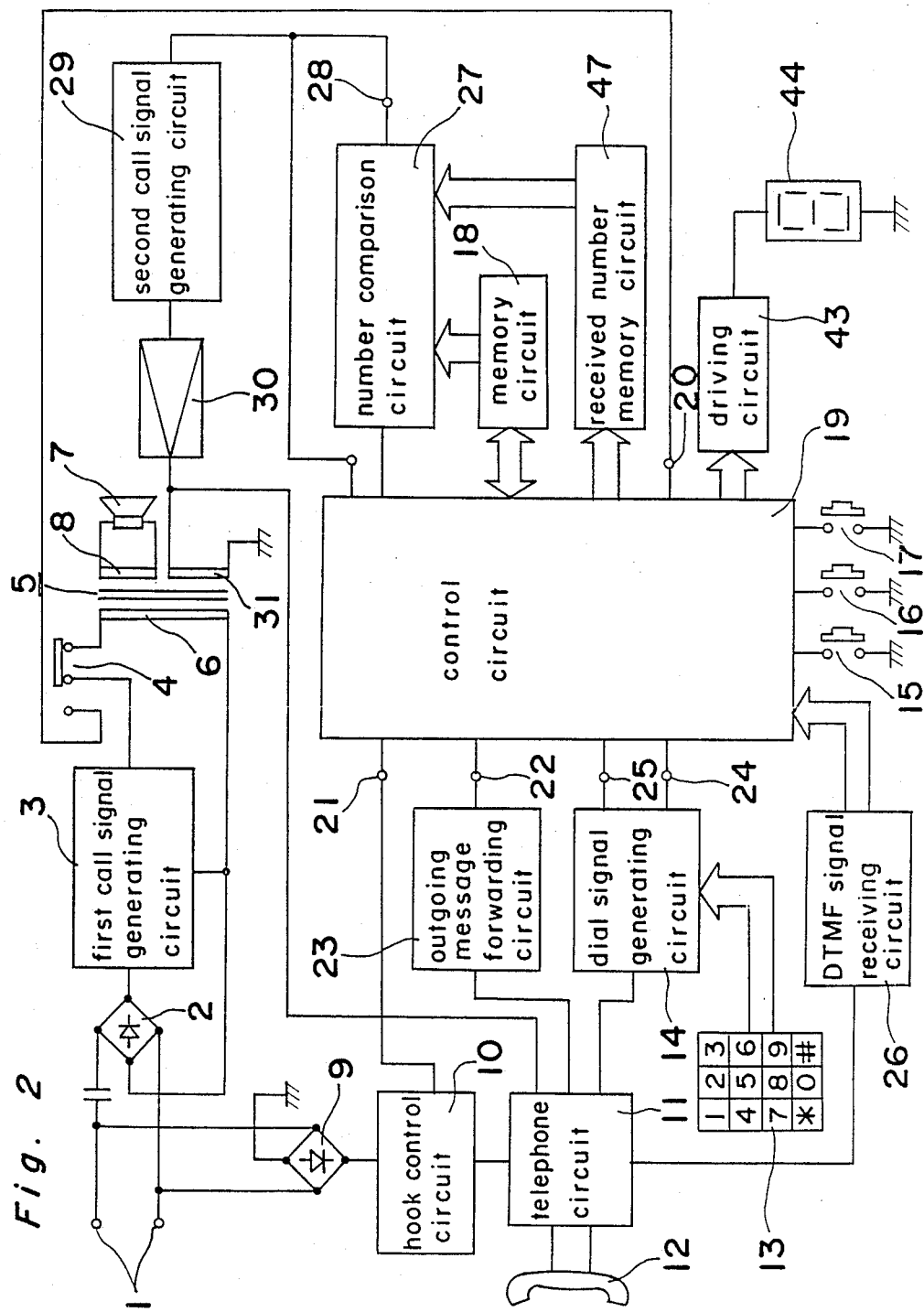
FIG. 2 is a circuit diagram showing the circuit structure of a party selecting circuit arrangement of a telephone according to a second embodiment of the present invention.

Next, the description will be directed to the case where the selection switch 4 is in the operable position which is opposite to the side indicated in FIG. 2, that is, in the position to effect the party selecting operation. When the call signal is received from the telephone line, with the selecting switch 4 in the operable position, the call signal is generated out of the first call signal generating circuit 3 as has been described earlier. In the above state, since the path of the signal to the first coil 6 constituting the transformer 5 is shut off through switching of the selecting switch 4, the call sound is not discharged out of the speaker 7. The call signal generated from the first call signal generating circuit 3 is, through the selecting switch 4, applied to the control terminal 20 provided with the control circuit 19. Thus, in consequence to this, the controlling operation is started by the control circuit 19. The application of the call signal to the control terminal 20 in the control circuit 19 allows a signal to be outputted to the output terminal 21 of the control circuit 19, thereby to close the telephone line by the hook control circuit 10. After the closing operation of the telephone line, a driving signal is sent to the driving signal outputting terminal 22 of the control circuit 19 to be applied to the outgoing message forwarding circuit 23. When the diving signal reaches the outgoing message forwarding circuit 23, the circuit 23 is turned operative to output the message stored in the message memory circuit, i.e., "This is . . . speaking. Please give me your telephone number." urging the secret number to the other party through the telephone circuit 11. If the other party, upon hearing the message, manipulates the dialing button for indicating his or her telephone number, a signal corresponding to each dialing button, namely, DTMF signal is sent out to the telephone line. The DTMF signal is applied to the DTMF signal receiving circuit 26 through the second diode bridge circuit 9, the hook control circuit 10, and the telephone circuit 11. Then, the DTMF signal receiving circuit 26 generates a signal coded correspondingly to the number of the DTMF signal to the control circuit 19. The coded signal inputted into the control circuit 19 is applied therethrough to the received number memory circuit 47. Thus, the signal is stored in the received number memory circuit 47. Then, the number stored by the received number memory circuit 47 is compared with the telephone number stored in the memory circuit 18 in the number comparing circuit 27. In the case where the number stored in the received number memory circuit 47 agrees with the telephone number stored in the memory circuit 18, an H level signal is outputted to the output terminal 28 of the number comparing circuit 27 and then applied to the second call signal generating circuit 29. Consequently, the second call signal generating circuit 29 is brought into the operable condition, thus generating a call signal different from that of the first call signal generating circuit 3. After the call signal from the second call signal generating circuit 29 is inputted to an amplifier by the amplification circuit 30, the signal is applied to the third coil 31 constituting the transformer 5. Accordingly, the call signal is induced to the second coil 8 which is connected with the speaker 7 as a load. Thus, the call signal is discharged as a call sound from the speaker 7. During the calling-up or sounding operation as above, the call signal amplified by the amplification circuit 30 and generated from the second call signal generating circuit 29 is sent out to the other party through the telephone circuit 11, and therefore the other party can recognize that the sounding operation is being effected after the call is received. Moreover, the driving circuit 43 is turned on when the number stored in the received number memory circuit 47 and the telephone number stored in the memory circuit 18 are found coincident with each other as a result of the comparison by the number comparing circuit 27, and at the same time the number of the automatic dialing operation button provided in correspondence to the memory storing the coincided telephone number is indicated on the numerical indicator 44 as, for instance "1". Accordingly, the owner of the telephone can not only recognize by the call sound discharged by the speaker 7 that the call is coming, but also find out from the difference of the call sound that the call is made in accordance with the party selecting operation. Further, the owner can find out who the other party is by the number indicated by the numerical indicator 44. After the owner of the telephone has made the above-described recognition and takes the handset 12 off the hook, all of the number comparing circuit 27, the second call signal generating circuit 29 and the driving circuit 43 are brought into the inoperable condition, so that the conversation between the owner and the other party can be started.

It is advantageous that since it is so arranged that the driving circuit 43 for driving the numerical indicator 44 is brought into the inoperable condition when the handset 12 is placed off the hook to start the conversation with the other party, the power consumption during the conversation can be reduced. In the case where the owner does not take the handset 12 off the hook while the call signal from the second call signal generating circuit 29 is being discharged through the speaker 7, the telephone line is released to be opened by the hook control circuit 10 by the action of the control circuit 19 after a predetermined time has passed, and at the same time each circuit is returned into the inoperable condition. Thus, as described hereinabove, although the sounding operation by the call signal generated by the second call signal generating circuit 29 and also the party indication operation by the numerical indicator 44 are carried out when the number sent by the other party is coincident with the telephone number stored in the memory circuit 18, neither the call-up operation nor the indicating operation is carried out, without any H level signal outputted to the output terminal 28 of the number comparing circuit 27 when the above two numbers are not coincident with each other. Then, after the lapse of the predetermined time, the control circuit 19 operates the hook control circuit 10 so as to release the telephone line from its closed condition. If the other party hangs up during the calling-up operation or the party indicating operation, the control circuit 19 is actuated by a circuit which detects the change of the signal of the telephone line, thereby releasing the telephone line to be opened and returning each circuit to the original state. Therefore, if the call comes from the party having the telephone number not coincident with the telephone number stored in the memory circuit 18, the call signal is not discharged from the speaker 7, such that a mischievous call or an erroneous call can be avoided.

It is to be noted here that although the number of the telephone numbers stored in the memory circuit for automatic dialing is three in the above second embodiment of the present invention, the number is not limited to three. In the case where the number of the stored telephone numbers is, e.g., 16 in two digits, it is needless to say that the indication by the numerical indicator 44 is made in two digits. Moreover, although the telephone number stored in the memory circuit provided for automatic dialing is arranged to be compared with the number sent by the other party through manipulation of a single button in the foregoing embodiment, it may be possible in a telephone which is adapted to call up the telephone number stored in the memory circuit through shortening of dialing, namely, by particular operation of the dial operating button 13, to compare the telephone number stored in the memory circuit. In this case, the number by the shortened dialing is indicated by the numerical indicator 44. Moreover, the circuit arrangement can be built in a telephone with two automatic dialing functions, that is, a telephone able to be dialed by a single operating button and through the shortened dialing. In this case, if the number of dialings by the single operating button is set within 9, the indication is always done in two digits in the case of the shortened dialing, resulting in distinction of the indication between the number by the single dialing button and that by the shortened dialing. Furthermore, if the indication by the numerical indicator 44 is made in four digits, the telephone number stored in the memory circuit can be indicated as it is. Although the outgoing message is stored in the memory circuit for the outgoing message forwarding circuit 23, a tape recorder can be used.

According to the party selecting circuit arrangement of the second embodiment of the present invention, it is so arranged that only when the number corresponding to the DTMF signal sent out by the other party after the call has been received is coincident with the telephone number stored in the memory circuit, the call signal is discharged through the speaker. Therefore, the owner of the telephone can be protected from a mischievous call or an erroneous call. In addition to the above, since the telephone number stored in the memory circuit provided for automatic dialing is made use of for the secret number to select the party, not only does it become unnecessary that the secret number is informed to particular parties, but the problem caused when the other party forgets the secret number can be advantageously solved. Moreover, when the number corresponding to the DTMF signal sent out by the other party coincides with the telephone number stored in the memory circuit, the number of the automatic dialing operation button provided in correspondence to the memory circuit storing the coincident telephone number or, the telephone number is indicated by the numerical indicator, and accordingly it is advantageous and convenient that the owner of the telephone can recognize, before he or she answers the call, who the other party is. Additionally, in the arrangement according to the second embodiment of the present invention, if the owner starts the conversation with taking the handset off the hook, the numerical indicator is switched to be operable, resulting is such advantage that less power is consumed during the conversation. Thus, the arrangement of the second embodiment is considerably effective when applied to a telephone so constructed as to obtain driving power from the telephone line.

Figure 3:
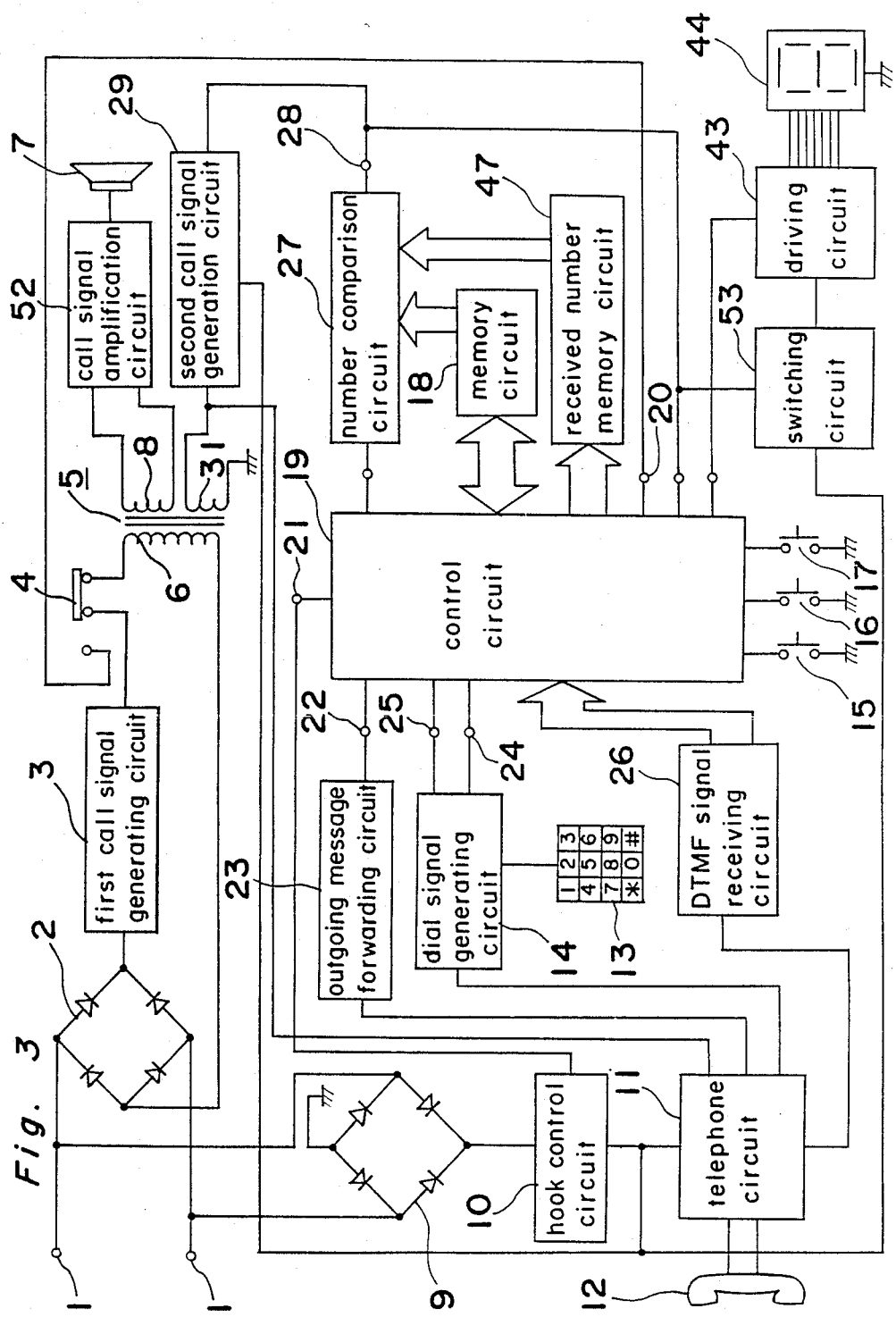
FIG. 3 is a circuit diagram showing the circuit structure of a party selecting circuit arrangement of a telephone according to a third embodiment of the present invention.
Figure 4:
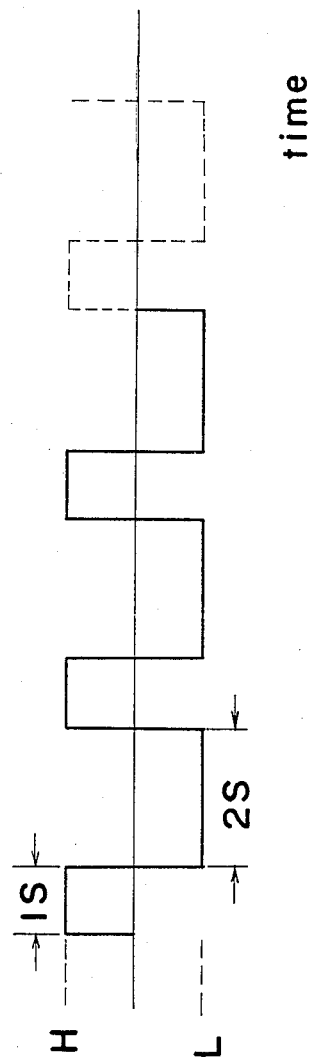
FIG. 4 is a waveform of an output signal generated by a number comparing circuit of FIG. 3.

Referring to a circuit diagram of FIG. 3, a party selecting circuit arrangement according to a third embodiment of the present invention is shown. In FIG. 4, a waveform of an output signal from a number comparing circuit in the circuit arrangement of FIG. 3 is illustrated. It is to be noted here that reference numerals 1–31 of FIG. 3 correspond respectively to reference numerals 1–31 of FIG. 1, and at the same time, reference numerals 43, 44 and 47 of FIG. 3 are respectively corresponding to reference numerals 43, 44 and 47 of FIG. 2, with the same structure, and therefore like parts are designated by like reference numerals and the description thereof will be abbreviated.

The party selecting circuit arrangement according to the third embodiment of the present invention further includes a call signal amplification circuit 52 for amplifying the call signal induced to the second coil 8 of the transformer 5. The speaker 7 discharges an output from this amplification circuit 52. When an L level signal is generated from the output terminal 28 of the number comparing circuit 27, a switching circuit 53 is turned on. The driving circuit 43 is brought into the operable condition upon receipt of the driving power through the switching circuit 53 in the on-state, which is arranged to become operable when the number corresponding to the DTMF signal sent out by the other party coincides with the telephone number stored in the memory circuit 18. Concurrently with this, the driving circuit 43 actuates the numerical indicator 44 to indicate the number of the automatic dialing operation button storing the coincided telephone number. In the party selecting circuit arrangement having the above-described construction, if the number sent out by the other party does not agree with the telephone number stored in the memory circuit 18, the hook control circuit 10 is driven to release the telephone line from its closed state after the lapse of the predetermined time. While the call signal is being discharged from the second call signal generating circuit 29 through the speaker 7, in other words, while the calling-up operation as a result of the coincidence upon comparison between the two numbers by the number comparing circuit 27 is being carried out, if the handset 12 is taken off the hook, the second call signal generating circuit 29 is brought into the inoperable condition, and simultaneously both the switching circuit 53 and the driving circuit 43 are turned off. The party selecting circuit arrangement according to the third embodiment of the present invention having the above-described construction will operate as follows.

The operation of the party selecting circuit arrangement according to the third embodiment of the present when it serves as a normal telephone is quite the same as in the case of the first embodiment shown in FIG. 1, the description of which will therefore be abbreviated here. Moreover, the operation of the party selecting circuit arrangement according to the third embodiment of the present invention when the selecting switch 4 is in the position opposite to that shown in FIG. 1, namely, in the position where the party selecting operation is conducted is carried out generally in the same manner as in the case of the second embodiment of FIG. 2, and therefore the former half of the operation will be abbreviated. Accordingly, explanation will be started from the stage where the DTMF signal sent out from the other party is applied to the DTMF signal receiving circuit 26 through the second diode bridge circuit 9, the hook control circuit 10 and the telephone circuit 11.

When the DTMF signal sent by the other party is applied to the DTMF signal receiving circuit 26, the DTMF signal receiving circuit 26 outputs a signal which is coded in correspondence to the number given by the DTMF signal receiving circuit 26 to the control circuit 19. The signal inputted to the control circuit 19 is then applied to the received number memory circuit 47 to be stored therein. The number comparing circuit 27 compares the number stored in the received number memory circuit 47 with the telephone number stored in the memory circuit 18. In the foregoing state, if the number stored in the received number memory circuit 47 coincides with the number stored in the memory circuit 18, a signal of a square waveform as shown in FIG. 4 is outputted from the output terminal 28 of the number comparing circuit 27. The signal is alternately at H level for approximately one second and at L level for approximately two seconds. When the signal is at H level, the second call signal generating circuit 29 is supplied with the driving power from the telephone line through the second diode bridge circuit 9 and the hook control circuit 10, thereby to be turned operable. As a result, the second call signal generating circuit 29 discharges a signal having the sound different from the call sound of the first call signal generating circuit 3 to the third coil 31. The signal applied to the second call signal generating circuit 29 is induced to the second coil 8, and amplified by the call signal amplification circuit 52. Thereafter, the call having the different sound generated from the first call signal generating circuit 3 is discharged for about one second by the second call signal generating circuit 29. On the other hand, when the signal outputted by the number comparing circuit 27 is at L level, the switching circuit 53 is turned on, so that the driving power supplied from the telephone line so as to actuate the second call signal generating circuit 29 is supplied to the driving circuit 43 which is therefore turned into the operable condition. Accordingly, the driving circuit 43 receives, from the control circuit 19, an information of the number of the automatic dialing operation button provided in correspondence to the memory storing the coincident telephone number, thereby to indicate, for example, "1" on the numerical indicator 44 for approximately two seconds. In the manner as above, the sounding operation for one second and the indicating operation for two seconds are alternately repeated in correspondence to the output signal from the number comparing circuit 27. At the silent time while the call sound is being discharged, the owner of the telephone can see the indication by the numerical indicator 44. Thus, by the call sound composed of output signals from the second call signal generating circuit 29, the owner of the telephone can recognize the fact that an incoming call is received. Besides, by the number indicated on the numerical indicator 44 for two seconds with one-second interval, the owner can recognize who the other party is. After the recognition by the owner of the telephone, with the handset 12 off the hook, the number comparing circuit 27, the second call signal generating circuit 29, the switching circuit 53 and the driving circuit 43 are turned into the inoperable condition, and at the same time, the owner can start the conversation with the other party. As described above, when the number sent by the other party agrees with the telephone number stored in the memory circuit 18, the call signal is outputted from the second call signal generating circuit 29 to be discharged through the speaker 7, and also the number is indicated by the numerical indicator 44 to indicate who is the other party. However, if the number sent by the other party does not agree with any number stored in the memory circuit 18, no output signal is generated from the output terminal 28 of the number comparing circuit 27, without the calling-up operation and the indicating operation effected. Then, when the predetermined time has passed, a signal for releasing the closed state of the telephone line is outputted to the hook operation control signal output terminal 21 provided with the control circuit 19, so that the telephone line is released from being closed by the hook control circuit 10. In the manner as described above, in the case where the incoming call is from the other party having the number not coincident with the telephone number stored in the memory circuit 18, the call sound is not discharged from the speaker 7, and therefore the party selecting circuit arrangement of the present invention is effective in exclusion of a mischievous call or an erroneous call.

It is to be noted that although the above third embodiment has been described with reference to the case where the three telephone numbers are stored in the memory for automatic dialing, the number of the stored telephone numbers is not limited to three. Moreover, in order to make indication of the other party, the numerical indicator 44 is employed in the third embodiment, but, it does not matter if a light emitting diode is provided correspondingly to each of the automatic dialing operation buttons which is provided in correspondence to the memory storing the coincided telephone number. Further, the waveform of the output signal of the number comparing circuit 27 is not restricted to that square form shown in FIG. 4, but the output from the number comparing circuit 27 may be any continuous signal regularly and alternately repeating two levels such as H level and L level. Moreover, although the outgoing message is arranged to be stored in the memory circuit for the outgoing message forwarding circuit 23 according to the third embodiment, such outgoing message forwarding circuit may be replaced with a tape recorder.

As is clear from the foregoing description, in the party selecting circuit arrangement according to the third embodiment of the present invention, if the number corresponding to the DTMF signal sent by the other party is coincident with the secret number, the call signal generating circuit is brought into the operable condition by the driving power only when the number comparing circuit which repeatedly and regularly generates an output signal at a first level and at a second level alternately generates the first level output, such that the call signal is discharged through the speaker. On the other hand, the indication circuit is arranged to be turned operable only when it receives the second level output signal from the number comparing circuit, such that it is indicated that the secret number is being received. Since it is so arranged that the call signal generating circuit and the indication circuit are not simultaneously turned on, the telephone becomes able to function with the use of low current from the telephone line while the handset is off the hook.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A party selecting circuit arrangement of a telephone which comprises:
    an automatic dialing system which is so arranged that, when one of automatic dialing operation buttons is manipulated, a telephone number which is stored in a memory circuit of the telephone in correspondence to said automatic dialing operation button is called up to send out a dialing signal;
    a discharging device which discharges a call signal when a number corresponding to a DTMF signal sent by a party other than an owner of the telephone after the incoming call is received is coincident with a secret number; and
    an indicating element provided in correspondence to said automatic dialing operation button,
    said indicating element corresponding to the automatic dialing operation button provided in correspondence to the memory circuit storing the telephone number being arranged to be turned on when said telephone number stored in said memory circuit agrees with the number corresponding to the DTMF signal sent by the other party, with a call sound being discharged from said discharging device.

2. A part selecting circuit arrangement of a telephone which comprises:
    an automatic dialing system which is so arranged that, when one of automatic dialing operation buttons is manipulated, a telephone number which is stored in a memory circuit of the telephone in correspondence to said automatic dialing operation button is called up to send out a dialing signal; and
    a discharging device which discharges a call signal when a number corresponding to a DTMF signal sent by a party other than an owner of the telephone after the incoming call is received is coincident with a secret number; and
    wherein, when the number corresponding to the DTMF signal sent by the other party agrees with the telephone number stored in said memory circuit, a call sound is discharged and at the same time, a number of the automatic dialing operation button provided in correspondence to the memory circuit storing said telephone number is indicated by a numerical indicator.

3. In a party selecting circuit arrangement of a telephone which comprises:
    an automatic dialing system which is so arranged that, when one of automatic dialing operation buttons is manipulated, a telephone number which is stored in a memory circuit of the telephone in correspondence to said automatic dialing operation button is called up to send out a dialing signal; and
    a discharging device which discharges a call signal when a number corresponding to a DTMF signal sent by a party other than an owner of the telephone after the incoming call is received is coincident with a secret number;
    the improvement further including:
    a number comparing circuit for comparing the number corresponding to the DTMF signal sent by the other party with the telephone number stored in the memory circuit;
    a call signal generating circuit which is turned into operable condition to generate a call signal by a signal outputted by said number comparing circuit when said number corresponding to the DTMF signal is coincident with the telephone number; and
    a numerical indicator which is turned into operable condition when said number comparing circuit outputs a signal upon coincidence of the two numbers, such that the telephone number or the number of the automatic dialing operation button provided in correspondence to the memory circuit storing the coincident telephone number is indicated;
    said call signal generating circuit and said numerical indicator being switched into inoperable condition when the handset is taken off the hook while the call sound is being discharged in accordance with the party selecting operation.

4. A party selecting circuit arrangement of a telephone which comprises:
    a first call signal generating circuit which detects a ringer signal sent by a party other than an owner of the telephone, thereby to generate a first call signal;
    a hook control circuit which is controlled by said first call signal to close the telephone line;
    a number comparing circuit which compares a number corresponding to a DTMF signal sent by the other party with a secret number after the closure of the telephone line, and generates a signal regularly repeating a first level and a second level alternately when said numbers are coincident with each other;
    a second call signal generating circuit which is turned into operable condition in response to a signal at the first level outputted by said number comparing circuit, and generates a second call signal; and
    an indication circuit which is turned into operable condition in response to the signal at the second level outputted by said number comparing circuit, thereby to make indication.

* * * * *